(12) United States Patent
Akasaka et al.

(10) Patent No.: US 6,795,608 B2
(45) Date of Patent: Sep. 21, 2004

(54) OPTICAL COMMUNICATION LINK

(75) Inventors: Youichi Akasaka, Foster City, CA (US); Tamotsu Kamiya, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 67 days.

(21) Appl. No.: 10/164,634

(22) Filed: Jun. 10, 2002

(65) Prior Publication Data

US 2003/0081889 A1 May 1, 2003

(30) Foreign Application Priority Data

Jun. 12, 2001 (JP) ........................................ 2001-176438

(51) Int. Cl.$^7$ ................................................ G02B 6/28
(52) U.S. Cl. ........................................ 385/24; 385/123
(58) Field of Search ............................... 385/11, 24, 27, 385/28, 31, 123, 126, 127; 359/344; 398/147

(56) References Cited

U.S. PATENT DOCUMENTS

| | | | |
|---|---|---|---|
| 6,031,955 A | 2/2000 | Mukasa et al. | ............. 385/123 |
| 2002/0012509 A1 * | 1/2002 | Mukasa | ...................... 385/123 |
| 2003/0035207 A1 * | 2/2003 | Gray et al. | ................. 359/344 |
| 2003/0185574 A1 * | 10/2003 | Inada | ......................... 398/147 |

FOREIGN PATENT DOCUMENTS

WO    WO 01/01179    4/2001

OTHER PUBLICATIONS

Patent Abstracts of Japan, JP 2000–261376, Sep. 22, 2000.

* cited by examiner

*Primary Examiner*—Phan T. H. Palmer
(74) *Attorney, Agent, or Firm*—Oblon, Spivak, McClelland, Maier & Neustadt, P.C.

(57) ABSTRACT

An optical communication link that has an optical transmission line constructed by combining a positive dispersion optical fiber having a positive dispersion value with a negative dispersion optical fiber having a negative dispersion value, in a wavelength region to be used:

wherein a dispersion value of the positive dispersion optical fiber is 5 ps/nm/km or more and 15 ps/nm/km or less; and wherein DPS values of both the positive dispersion optical fiber and the negative dispersion optical fiber are 250 nm or more, the DPS values being obtained by dividing dispersion values of the respective fibers at a wavelength of 1550 nm by a dispersion gradient.

12 Claims, 3 Drawing Sheets

OPTICAL COMMUNICATION LINK

FIELD

The present invention relates to an optical communication link that uses an optical fiber for performing wavelength-division multiplexing (WDM) optical transmission.

BACKGROUND

To increase the transmission capacity of an optical fiber, there are extensively studied techniques of performing WDM optical transmission. In particular, recently, there has been also studied an ultrafast WDM optical transmission system whose channel transmission speed is 40 Gbps or faster.

In general, to realize a WDM optical transmission system, it is required that there occurs no unrecoverable waveform distortion at a relay point and in an optical reception apparatus. To attain this, it is conceived that the suppression of a nonlinear phenomenon in an optical transmission line and the reduction of accumulated dispersion are effective. Also, if there exist differences in dispersion value between wavelengths of respective optical signals, this leads to fluctuation of transmission quality caused by the difference of waveform distortion amounts among wavelengths. Accordingly, it is required to reduce changes in dispersion value (dispersion gradient) dependent on wavelengths in the optical transmission line as small as possible.

As a result, in many WDM optical transmission systems, there has been adopted an optical transmission line constructed by combining an optical fiber having positive dispersion (dispersion value) (hereinafter referred to as "positive dispersion optical fiber") with an optical fiber having negative dispersion (dispersion value) (hereinafter referred to as "negative dispersion optical fiber").

However, no conventional WDM optical transmission system, which is capable of suppressing a nonlinear phenomenon in an optical transmission line and sufficiently reducing accumulated dispersion, has been put into practical use.

Also, to suppress the accumulated dispersion, and the fluctuation of unrecoverable waveform distortion, which is caused by interaction with accumulated dispersion and a nonlinear phenomenon, between wavelengths, it is also required to sufficiently reduce a dispersion gradient in an optical fiber constituting an optical transmission line. However, no optical transmission line, which is constructed by combining a positive dispersion optical fiber and a negative dispersion optical fiber that satisfy such requirements, has been put into practical use.

For the reasons described above, it has been extremely difficult to construct an ultrafast WDM optical transmission system.

SUMMARY

The present invention is an optical communication link, which comprises an optical transmission line that is constructed by combining a positive dispersion optical fiber having a positive dispersion value with a negative dispersion optical fiber having a negative dispersion value, in a wavelength region to be used:
wherein a dispersion value of the positive dispersion optical fiber is 5 ps/nm/km or more and 15 ps/nm/km or less; and
wherein DPS values of both the positive dispersion optical fiber and the negative dispersion optical fiber are 250 nm or more, the DPS values being obtained by dividing dispersion values of the respective fibers at a wavelength of 1550 nm by a dispersion gradient.

Other and further features and advantages of the invention will appear more fully from the following description, taken in connection with the accompanying drawings.

DETAILED DESCRIPTION

According to the present invention, there are provided the following means:
(1) An optical communication link, comprising an optical transmission line that is constructed by combining a positive dispersion optical fiber having a positive dispersion value with a negative dispersion optical fiber having a negative dispersion value, in a wavelength region to be used:
wherein a dispersion value of the positive dispersion optical fiber is 5 ps/nm/km or more and 15 ps/nm/km or less; and
wherein DPS (dispersion per slope) values of both the positive dispersion optical fiber and the negative dispersion optical fiber are 250 nm or more, the DPS values being obtained by dividing dispersion values of the respective fibers at a wavelength of 1550 nm by a dispersion gradient; and
(2) The optical communication link according to the item (1), further comprising a dispersion compensator that compensates for dispersion remaining in the optical transmission line.

The optical communication link of the present invention described in the item (1) is based on results of studies and experiments intensively conducted. When the properties of the positive dispersion optical fiber and the negative dispersion optical fiber constituting the optical communication link in which the optical transmission line is used, are determined in the manner described above, there are suppressed an influence of accumulated dispersion and a nonlinear phenomenon in the optical communication line. As a result, it becomes possible to preferably perform ultrafast WDM optical transmission of 40 Gbps/ch or faster.

Here, the reason why the dispersion value of the positive dispersion optical fiber is set to be 5 ps/nm/km or more and 15 ps/nm/km or less will be described below. If the dispersion value is smaller than 5 ps/nm/km, there tends to occur a nonlinear phenomenon called four-wave mixing. Also, if the dispersion value is greater than 15 ps/nm/km, the accumulated dispersion in the optical transmission line is increased. Therefore, both of these cases are not suited for ultrafast WDM optical transmission.

When the optical communication link is constructed by using the dispersion compensator, in the manner described in the item (2), the differences in dispersion value between wavelengths are further reduced at a relay point and in an optical reception apparatus, so that it becomes possible to more preferably perform ultrafast WDM optical transmission.

Embodiments of the present invention will be described below with reference to the drawings. Hereinafter, the same numerals have the same meanings in the following description and each of drawings.

Figure 1:
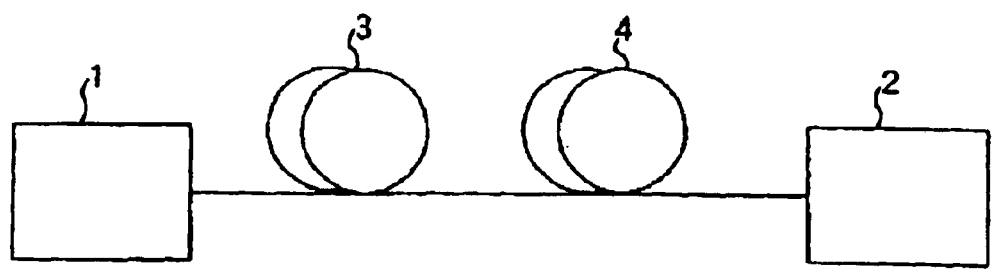
FIG. 1 is a schematic explanation view showing a first embodiment of the optical communication link of the present invention.

FIG. 1 is the schematic explanation view showing the first embodiment of the optical communication link of the present invention. In FIG. 1, reference numeral 1 denotes an optical transmission apparatus; 2, an optical reception apparatus; 3, a positive dispersion optical fiber transmission line; and 4, a negative dispersion optical fiber transmission line. Here, the positive dispersion optical fiber transmission line 3 is an optical transmission line constructed by embedding a positive dispersion optical fiber into an optical fiber cable or the like, while the negative dispersion optical fiber transmission line 4 is an optical transmission line constructed by embedding a negative dispersion optical fiber into an optical fiber cable or the like.

Figure 2:
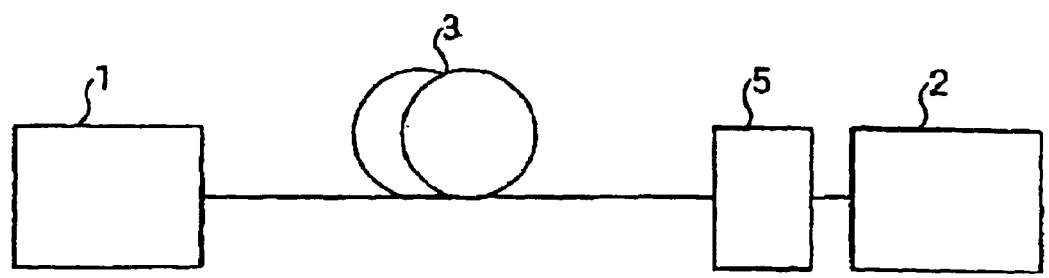
FIG. 2 is a schematic explanation view showing a second embodiment of the optical communication link of the present invention.

FIG. 2 is the schematic explanation view showing the second embodiment of the optical communication link of the present invention. In FIG. 2, reference numeral 5 denotes a negative dispersion optical fiber module. Here, the negative dispersion optical fiber module 5 is a module obtained by winding a negative dispersion optical fiber around a reel or the like, and the resulting module 5 is arranged just before an optical reception apparatus 2 in this embodiment.

Figure 3:
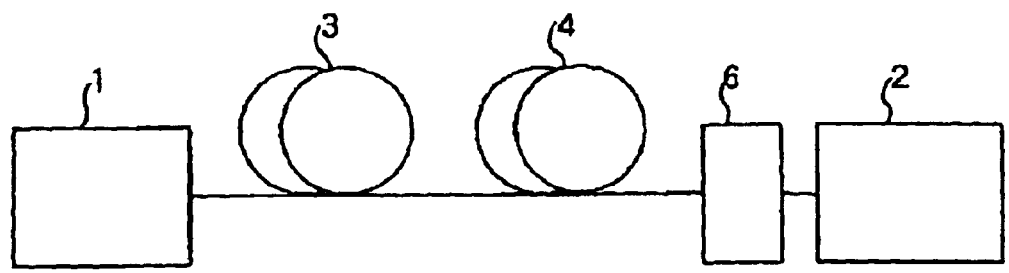
FIG. 3 is a schematic explanation view showing a third embodiment of the optical communication link of the present invention.

FIG. 3 is the schematic explanation view showing the third embodiment of the optical communication link of the present invention. In FIG. 3, reference numeral 6 denotes a dispersion compensator. Here, the dispersion compensator 6 compensates for minute dispersion remaining in the optical transmission line constructed by combining the positive dispersion optical fiber transmission line 3 with the negative dispersion optical fiber transmission line 4. In this embodiment, the construction in the first embodiment is changed by arranging the dispersion compensator 6 just before the optical reception apparatus 2.

Figure 4:
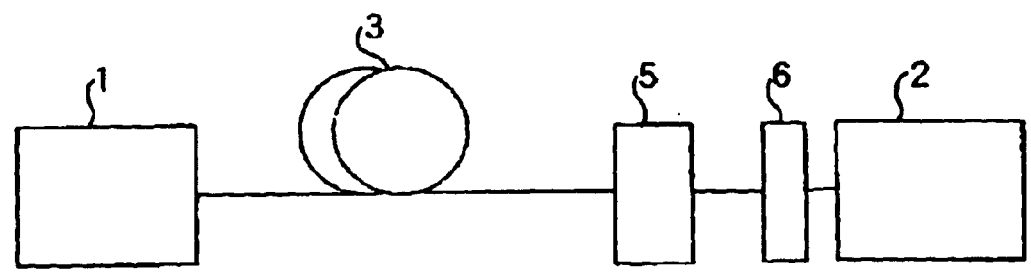
FIG. 4 is a schematic explanation view showing a fourth embodiment of the optical communication link of the present invention.

FIG. 4 is the schematic explanation view showing the fourth embodiment of the optical communication link of the present invention. In this embodiment, the construction in the second embodiment is changed by arranging the dispersion compensator 6 just before the optical reception apparatus 2.

It should be noted here that the embodiments of the present invention include a form in which at least one of the optical transmission apparatus 1 and the optical reception apparatus 2 is replaced with an optical repeating apparatus, in FIGS. 1 to 4. It should be noted that the optical repeating apparatus is composed, for example, of an optical amplifier, which amplifies a received optical signal without converting the optical signal into an electric signal.

Also, the appearance of the negative dispersion optical fiber transmission line 4 clearly differs from the appearance of the negative dispersion optical fiber module 5, but there occurs no problem even if the same kind of the negative dispersion optical fiber is used in each of them.

Also, for example, the dispersion compensator 6 is composed of an optical fiber that compensates for a dispersion gradient in the whole of an optical transmission line or is composed of an optical fiber having a construction where a lattice is formed in a core or the like. However, the form of the dispersion compensator 6 is appropriately determined by the required characteristics or the like of the optical communication link.

There is no particular limitation on the refractive index profile structure of the positive dispersion optical fiber for use in the optical communication link of this embodiment so long as this fiber has a dispersion value of 5 ps/nm/km or more and 15 ps/nm/km or less and has a DPS value of 250 nm or more.

It should be noted here that as to the characteristics of the positive dispersion optical fiber described above, it is preferable that the increasing amount of bending loss in the case of a diameter of 20 mm is 10 dB/m or below on the longest wavelength side in a used wavelength region and it is also preferable that the average polarization (mode) dispersion is 0.15 ps·km$^{-1/2}$ or below.

With the optical communication link of the present invention, it becomes possible to construct an ultrahigh-speed WDM optical transmission system that is capable of preferably performing ultrahigh-speed WDM optical transmission of 40 Gbps/ch or faster.

According to the present invention, by combining a specific positive dispersion optical fiber with a specific negative dispersion optical fiber, the resulting construction can exhibit an excellent effect to give an optical communication link preferable for ultrahigh-speed WDM optical transmission.

In the following description, the present invention will be explained in more detail referring to examples, but the present invention is not meant to be limited by these examples.

EXAMPLES

In the following examples, as to the optical communication link constructed by connecting an optical fiber transmission line between the optical transmission apparatus 1 and the optical reception apparatus 2, as shown in FIG. 1, the constructions of the positive dispersion optical fiber transmission line 3 and the negative dispersion optical fiber transmission line 4 were changed in various ways. The evaluations of the various constructions were made by evaluating the degradation of an optical signal transmitted by the optical communication link, using a bit error rate (BER) as an index.

It should be noted here that in the following examples, the distance between the optical transmission apparatus 1 and the optical reception apparatus 2 was set at around 100 km, 16 waves of an optical signal at 40 Gbps/ch were arranged at regular intervals within a wavelength range of 1540 nm to 1564 nm, and the signal optical level in the optical reception apparatus 2 was set to be constant.

The characteristics of three types of positive dispersion optical fibers (as represented by positive dispersion 1, 2, and 3) used in this examples are shown in Table 1 given below, while the characteristics of three types of negative dispersion optical fibers (as represented by negative dispersion 1, 2, and 3) are shown in Table 2 given below. The dispersion values and DPS values of the positive dispersion optical fibers and negative dispersion optical fibers described above satisfied the conditions as defined in the above item (1). The characteristics of a single-mode optical fiber (SMF) and a non-zero dispersion shift optical fiber (NZDSF) as conventional examples are also shown in Table 1, for reference. It should be noted that, in each optical fiber, the unit of relative refractive-index differences on each optical fiber Δ1, Δ2, and Δ3 is "%", the unit of the internal diameter of cladding is "μm", the unit of dispersion is "ps/nm/km", the unit of DPS is "nm", and the unit of an effective core cross-sectional area $A_{eff}$ is "μm²".

TABLE 1

|  | Δ1 | Δ2 | Δ3 | Internal diameter of cladding | Dispersion | DPS | $A_{eff}$ |
|---|---|---|---|---|---|---|---|
| Positive Dispersion 1 | 0.62 | −0.41 | None | 14.3 | 9.6 | 430 | 40 |
| Positive Dispersion 2 | 0.45 | −0.18 | 0.10 | 24.3 | 11.9 | 260 | 60 |
| Positive Dispersion 3 | 0.50 | −0.25 | 0.22 | 22.2 | 11.6 | 270 | 57 |
| SMF | 0.30 | None | None | 10.5 | 16.9 | 304 | 79 |
| NZDSF | 0.90 | −0.15 | 0.2 | 15.0 | 7.0 | 100 | 50 |

TABLE 2

|  | Δ1 | Δ2 | Δ3 | Internal diameter of cladding | Dispersion | DPS | $A_{eff}$ |
|---|---|---|---|---|---|---|---|
| Negative Dispersion 1 | 1.2 | −0.30 | None | 11.5 | −19 | 395 | 28 |
| Negative Dispersion 2 | 2.0 | −0.52 | None | 8.3 | −75 | 333 | 20 |
| Negative Dispersion 3 | 2.2 | −0.55 | 0.25 | 7.5 | −116 | 289 | 18 |

Figure 5:
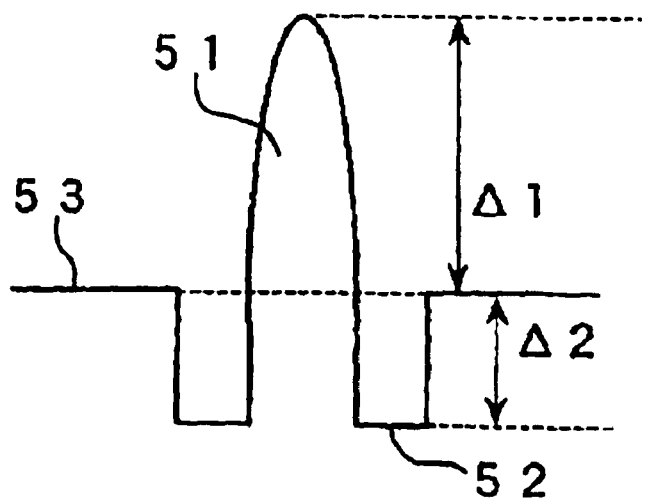
FIG. 5 is a schematic explanation view showing an example of a refractive index profile structure of a positive dispersion optical fiber and a negative dispersion optical fiber to be used in the examples according to the optical communication link of the present invention.

The optical fibers as represented by the positive dispersion 1 and the negative dispersion 1 and 2 each had the refractive index profile structure, as shown in FIG. 5. In FIG. 5, reference numeral 51 denotes a central core; 52, a ring-shaped region; and 53, cladding. Also, the central core 51 had the maximum relative refractive-index difference Δ1 with respect to the cladding 53, the ring-shaped region 52 had the minimum relative refractive-index difference Δ2 with respect to the cladding 53, Δ1>0, and Δ2<0. It should be noted that the respective boundaries among the central core 51, the ring-shaped region 52, and the cladding 53 were positioned at locations at which there was obtained each refractive index that was the same as the refractive index of the cladding 53.

Figure 6:
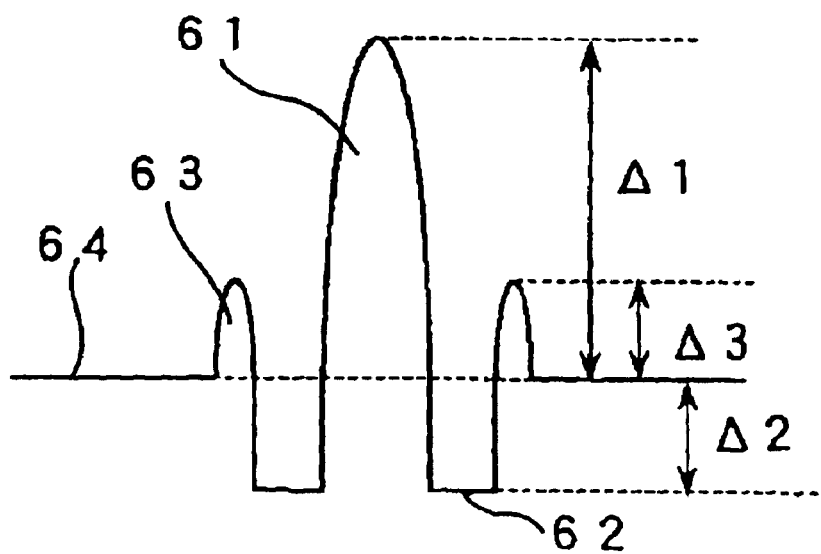
FIG. 6 is a schematic explanation view showing another example of the refractive index profile structure of the positive dispersion optical fiber and the negative dispersion optical fiber to be used in the examples according to the optical communication link of the present invention.

Also, the optical fibers as represented by the positive dispersion 2 and 3 and the negative dispersion 3 had the refractive index profile structure, as shown in FIG. 6. In FIG. 6, reference numeral 61 denotes a central core; 62, a first ring-shaped region; 63, a second ring-shaped region; and 64, cladding. Also, the central core 61 had the maximum relative refractive-index difference Δ1 with respect to the cladding 64, the first ring-shaped region 62 had the minimum relative refractive-index difference Δ2 with respect to the cladding 64, the second ring-shaped region 63 had the maximum relative refractive-index difference Δ3 with respect to the cladding 64, Δ1>0, Δ2<0, and Δ3>0. It should be noted that the respective boundaries among the central core 61, the first ring-shaped region 62, the second ring-shaped region 63, and the cladding 64 were positioned at locations at which there was obtained each refractive index that was the same as the refractive index of the cladding 64.

Example 1

Experiments in optical transmission were conducted using the optical communication link as shown in FIG. 1. In this example, there were obtained various combinations of positive dispersion optical fibers and negative dispersion optical fibers. That is, as shown in Table 3 given below, the optical fiber as represented by the positive dispersion 1 was combined with the optical fiber as represented by the negative dispersion 1, in Example 1a, while the optical fiber as represented by the positive dispersion 3 was combined with the optical fiber as represented by the negative dispersion 2, in Example 1b. Also, as to the results of the experiments in optical transmission, each result with a BER value not degraded and below $1\times10^{-11}$, through the optical communication link, was judged as "good", while each result with a BER value degraded to $1\times10^{-11}$, or more was judged as "poor".

Also, as Comparative Example 1, a single-mode optical fiber (SMF) shown in Table 1 having dispersion of 16.9 ps/nm/km, was combined with the optical fiber as represented by the negative dispersion 2. Further, as Comparative Example 2, a non-zero dispersion shift optical fiber (NZDSF) shown in Table 1 having a DPS value of 100 nm, was combined with the optical fiber as represented by the negative dispersion 3.

As to the experimental results, as shown in Table 3 given below, good results (◯) were obtained for Examples 1a and 1b that each used the positive dispersion optical fiber and the negative dispersion optical fiber, which satisfied the characteristics as defined in the item (1), while poor results (X) were obtained for Comparative Example 1 that used an SMF having a dispersion value exceeding 15 ps/nm/km. Also, in Comparative Example 2 that used an NZDSF having a DPS value of less than 250 nm, the dispersion gradient was not compensated for and the results in BER were poor on both of the long wavelength side and the short wavelength side.

TABLE 3

|  | Construction of Transmission Line | Results |
|---|---|---|
| Example 1a | Positive Dispersion 1 + Negative Dispersion 1 | ◯ |
| Example 1b | Positive Dispersion 3 + Negative Dispersion 2 | ◯ |
| Comparative Example 1 | SMF + Negative Dispersion 2 | X |
| Comparative Example 2 | NZDSF + Negative Dispersion 3 | X |

Example 2

Experiments in optical transmission were conducted using the optical communication link, as shown in FIG. 2. In this example, like in the above Example 1, there were obtained various combinations of positive dispersion optical fibers and negative dispersion optical fibers. That is, as shown in Table 4 given below, the optical fiber as represented by the positive dispersion 2 was combined with the optical fiber as represented by the negative dispersion 2, in Example 2a; the optical fiber as represented by the positive dispersion 3 was combined with the optical fiber as represented by the negative dispersion 2, in Example 2b; and the optical fiber as represented by the positive dispersion 3 was combined with the optical fiber as represented by the negative dispersion 3, in Example 2c.

Also, as Comparative Example 3, an SMF, shown in Table 1, having dispersion of 16.9 ps/nm/km was combined with the optical fiber as represented by the negative dispersion 3.

As to the experimental results, as shown in Table 4 given below, good results (○) were obtained for Examples 2a, 2b, and 2c that each used the positive dispersion optical fiber and the negative dispersion optical fiber, which satisfied the characteristics as defined in the item (1), while poor results (X) were obtained for Comparative Example 3 using an SMF having a dispersion value exceeding 15 ps/nm/km.

TABLE 4

|  | Transmission Line | Module | Results |
|---|---|---|---|
| Example 2a | Positive Dispersion 2 | Negative Dispersion 2 | ○ |
| Example 2b | Positive Dispersion 3 | Negative Dispersion 2 | ○ |
| Example 2c | Positive Dispersion 3 | Negative Dispersion 3 | ○ |
| Comparative Example 3 | SMF | Negative Dispersion 3 | X |

As can be seen from the results in Tables 3 and 4, it can be understood that the optical communication links of these examples according to the present invention make it possible to preferably perform ultrahigh-speed WDM optical transmission of 40 Gbps/ch or faster. It can also be understood that the optical communication links described as comparative examples are not suited for the ultrahigh-speed WDM optical transmission. The reason for this is assumed, for example, to be the increase of accumulated dispersion caused by the dispersion value of the SMF that was greater than 15 ps/nm/km.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An optical communication link, comprising an optical transmission line that is constructed by combining a positive dispersion optical fiber having a positive dispersion value with a negative dispersion optical fiber having a negative dispersion value, in a wavelength region to be used:
   wherein a dispersion value of the positive dispersion optical fiber is 5 ps/nm/km or more and 15 ps/nm/km or less; and
   wherein dispersion of the negative dispersion fiber is not more than −19 ps/nm/km and DPS values of both the positive dispersion optical fiber and the negative dispersion optical fiber are 250 nm or more, the DPS values being obtained by dividing dispersion values of the respective fibers at a wavelength of 1550 nm by a dispersion gradient.

2. The optical communication link as claimed in claim 1, further comprising an optical transmission apparatus, an optical reception apparatus, and an optical transmission line which is arranged between the apparatuses.

3. The optical communication link as claimed in claim 2, wherein at least one selected from the group consisting of the optical transmission apparatus and the optical reception apparatus is an optical repeating apparatus.

4. The optical communication link as claimed in claim 1, further comprising a dispersion compensator that compensates for dispersion remaining in the optical transmission line.

5. The optical communication link as claimed in claim 1, wherein the positive dispersion optical fiber has an increasing amount of bending loss of 10 dB/m or below, on the longest wavelength side in a used wavelength region, in the case of a diameter of 20 mm.

6. The optical communication link as claimed in claim 1, wherein the positive dispersion optical fiber has an average polarization dispersion of 0.15 ps·km$^{-1/2}$ or below.

7. An optical communication link, comprising an optical transmission line that is constructed by combining a positive dispersion optical fiber having a positive dispersion value with a negative dispersion optical fiber having a negative dispersion value, in a wavelength region to be used:
   wherein a dispersion value of the positive dispersion optical fiber is 5 ps/nm/km or more and 15 ps/nm/km or less; and
   wherein an effective area $A_{eff}$ for the positive dispersion fiber is between 40 and 60 $\mu m^2$ and DPS values of both the positive dispersion optical fiber and the negative dispersion optical fiber are 250 nm or more, the DPS values being obtained by dividing dispersion values of the respective fibers at a wavelength of 1550 nm by a dispersion gradient.

8. The optical communication link as claimed in claim 7, further comprising an optical transmission apparatus, an optical reception apparatus, and an optical transmission line which is arranged between the apparatuses.

9. The optical communication link as claimed in claim 8, wherein at least one selected from the group consisting of the optical transmission apparatus and the optical reception apparatus is an optical repeating apparatus.

10. The optical communication link as claimed in claim 7, further comprising a dispersion compensator that compensates for dispersion remaining in the optical transmission line.

11. The optical communication link as claimed in claim 7, wherein the positive dispersion optical fiber has an increasing amount of bending loss of 10 dB/m or below, on the longest wavelength side in a used wavelength region, in the case of a diameter of 20 mm.

12. The optical communication link as claimed in claim 7, wherein the positive dispersion optical fiber has an average polarization dispersion of 0.15 ps·km$^{-1/2}$ or below.

* * * * *